United States Patent [19]

O'Brien et al.

[11] Patent Number: 5,555,060
[45] Date of Patent: Sep. 10, 1996

[54] SELF CALIBRATING ACTUATOR POSITION CONTROL SYSTEM

[75] Inventors: Michael J. O'Brien; Richard A. Littlefield, both of Rochester, N.Y.

[73] Assignee: Eastman Kodak Company, Rochester, N.Y.

[21] Appl. No.: 447,472

[22] Filed: May 23, 1995

[51] Int. Cl.⁶ .............................. G03B 9/02; G03B 17/38; G03B 9/08
[52] U.S. Cl. ..................................... 354/271.1; 354/267.1; 354/234.1
[58] Field of Search ............................. 354/234.1, 271.1, 354/434, 435, 436, 437, 448, 480, 226, 267.1

[56] References Cited

U.S. PATENT DOCUMENTS

| | | |
|---|---|---|
| 4,679,667 | 9/1988 | Ishiguro et al. .......................... 354/435 |
| 4,907,027 | 3/1990 | Kobe et al. . |
| 5,134,435 | 7/1992 | Tsuboi et al. ............................ 364/435 |
| 5,325,142 | 6/1994 | Depatie et al. ....................... 354/234.1 |

*Primary Examiner*—Michael L. Gellner
*Assistant Examiner*—Nicholas J. Tuccillo
*Attorney, Agent, or Firm*—Francis H. Boos, Jr.

[57] ABSTRACT

An actuator position sensor employs a photo interrupter with an optical density gradient segment that has additional maximum and minimum density segments preceding the gradient segment. These preceding segments are sensed and sampled by a calibration circuit, preferably prior to each operation of the actuator, to generate high and low reference calibration values which are applied to a signal scaling circuit along with the gradient output signal. The scaling circuit is then able to generate a position output signal scaled between these reference values that is linearly proportional to the actuator position.

7 Claims, 7 Drawing Sheets

SELF CALIBRATING ACTUATOR POSITION CONTROL SYSTEM

FIELD OF THE INVENTION

The invention relates generally to the field of actuator position control sensors, and in particular to a control system for self calibration of actuator position control sensors useful in camera shutters, iris diaphragm controls, zoom lens deployment actuators and the like.

BACKGROUND OF THE INVENTION

Actuator position control systems are useful in cameras and photographic printers for exposure control by control shutter aperture opening and closing. It is known to use closed loop shutter controls for this purpose. Such control require a consistent feedback control that must be insensitive to temperature, humidity and long term drift conditions. Current types of control systems rely on sensor stability to maintain exposure accuracy. These are precalibrated during manufacture and must be manually recalibrated as part of a periodic maintenance service routine as the camera or photographic printer ages in order to maintain the necessary exposure accuracy. It is desirable therefore to provide actuator position control systems for camera and photographic printer shutters and similar apparatus which are automatically self-calibrated and avoid the need for manual recalibration as part of periodic service routines to maintain accurate and reliable of operation.

SUMMARY OF THE INVENTION

In accordance with the invention, therefore, there is provided a self calibrating actuator position control system which comprises an actuator for effecting a range of movement of an element, a portion of the movement range being controlled by a feedback control signal and includes a position sensor having a light source, a photo interrupter having a variable optical density pattern formed thereon and a photo detector for generating an output signal proportional to optical density of the photo interrupter. The photo interrupter pattern has an optical density gradient segment used to generate said feedback control signal and, in accordance with a particular feature of the invention, has calibration segments preceding said gradient segment, the calibration segments having predetermined maximum and minimum optical density values. The system of the invention further includes a calibration circuit responsive to the output signal during sensing of the maximum and minimum optical density segments for generating high and low output signal reference values from the maximum and minimum optical density segments and includes signal scaling means for generating a position control output signal from the gradient segment which is scaled between the high and low output signal reference values to have a proportionate correspondence between actuator position and the position control output signal.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
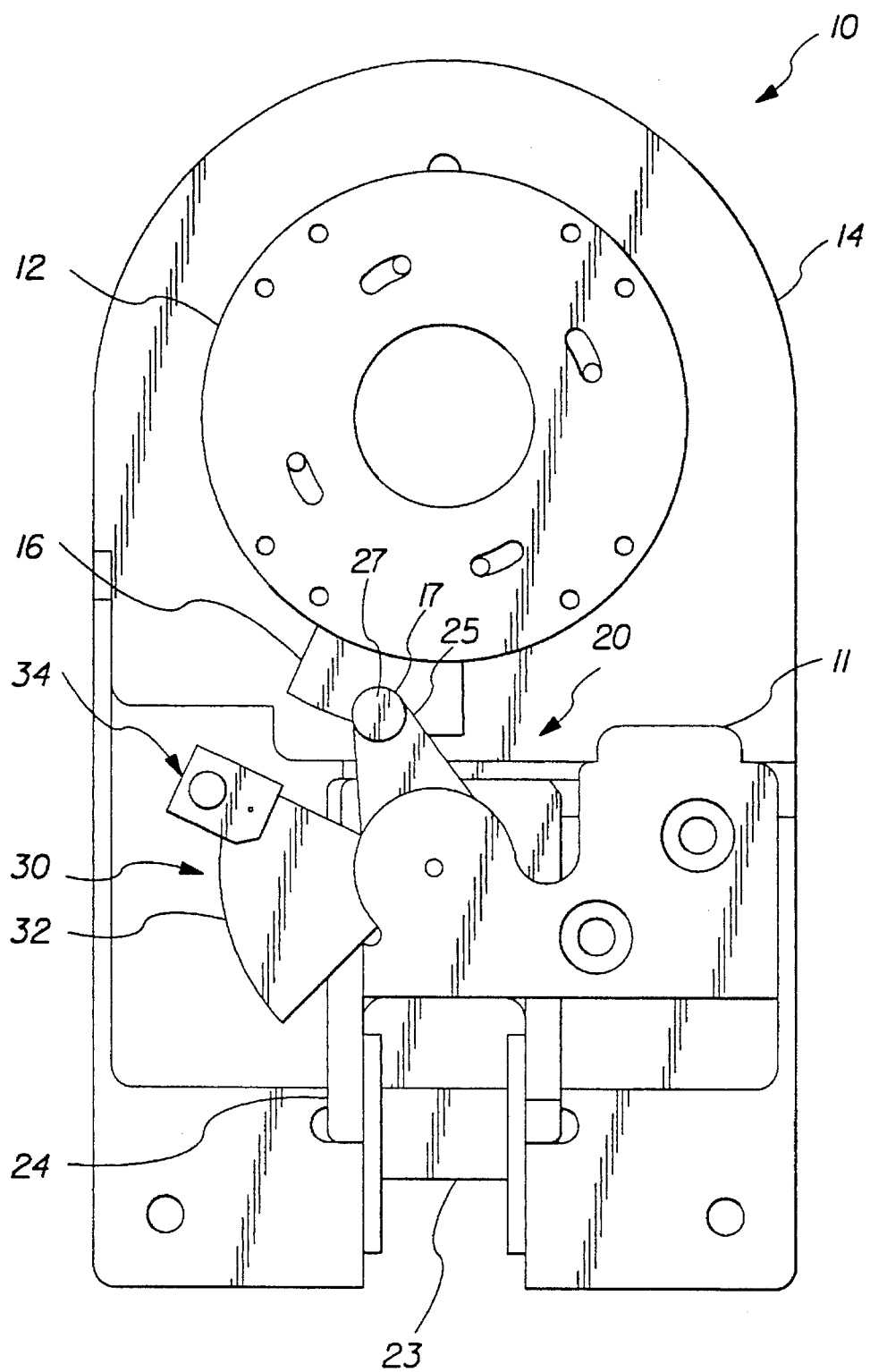
FIG. 1 illustrates a camera shutter and control assembly incorporating an optical gradient wedge shutter control in accordance with the invention.
Figure 2:
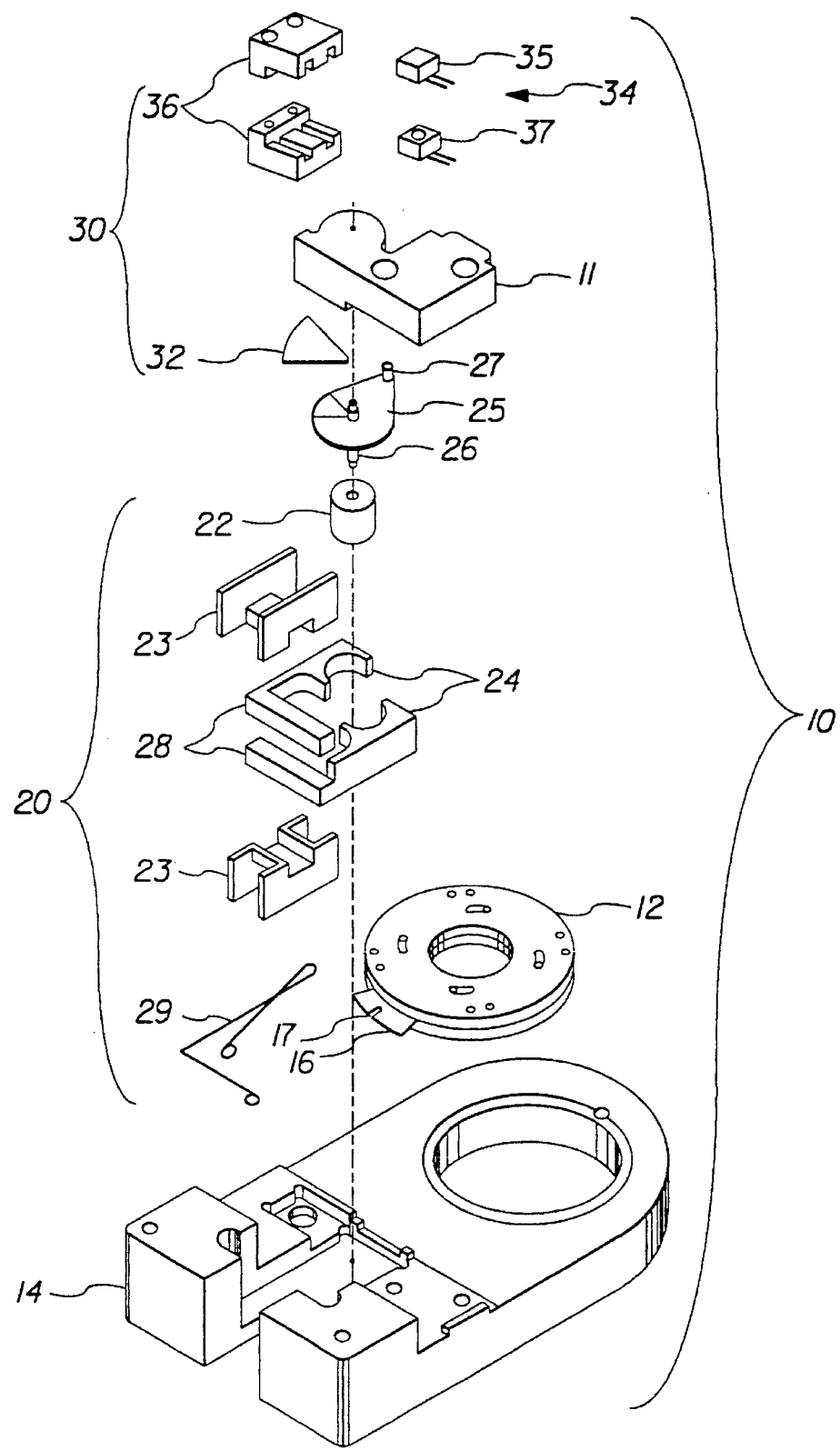
FIG. 2 is an exploded view of the shutter and control assembly of FIG. 1.

Referring now jointly to FIGS. 1 and 2, the actuator position control system of the invention will be described in conjunction with its use in a camera shutter operating mechanism 10 shown therein. The shutter operating mechanism 10 includes a shutter assembly 12 mounted on a base 14. Shutter 12 may be a conventional four blade sync ring type of shutter. A shutter operating tang 16 having a notch 17 extends outwardly from the shutter assembly 12. An actuator 20 includes a cylindrical permanent magnet 22 rotatable about a spindle 26 which is attached to actuator arm 25. The distal end of actuator arm 25 is provided with a drive post 27 which engages notch 17 to operate shutter assembly 12 when magnet 22 is rotated. Magnet 22 is rotatably nested within a circular opening in split poles 24. When assembled, a bobbin 23 surrounds legs 28 of the poles 24 and supports an actuating current coil (not shown) which operates in response to applied electrical current to cause rotation of the magnet 22 and consequent opening and closing of shutter blades in shutter assembly 12. As is typical in mechanisms of this type, the complete range of actuator movement, i.e. clockwise motion of the drive post 27, includes an initial portion in which the overlapping shutter blades are moving but the shutter aperture is not open. After this initial portion, the shutter blades aperture begins to open, referred to as the "crack of light" point and, during the ensuing portion of movement, actuator movement is controlled in known manner by a feedback signal derived from a position sensor.

The illustrated position sensor 30 comprises an opto sensor 34 and a pie shaped photo interrupter 32. Photo interrupter 32 is adhesively mounted onto actuator arm 25 to be rotatable therewith. Opto sensor 34 includes an LED light source 35 mounted in the upper half of housing 36 positioned on one side of the photo interrupter and a photo diode 37 mounted in the lower side of housing 36 positioned on the other side of the photo interrupter. Photo interrupter 32 and opto sensor 34 cooperate to provide a sensor output signal which includes a position-dependent portion for use in controlling the operation of the shutter assembly in accordance with the teachings of commonly assigned U.S. Pat. No. 5,325,142—Depatie et al, the disclosure of which is incorporated herein by reference.

Figure 3:
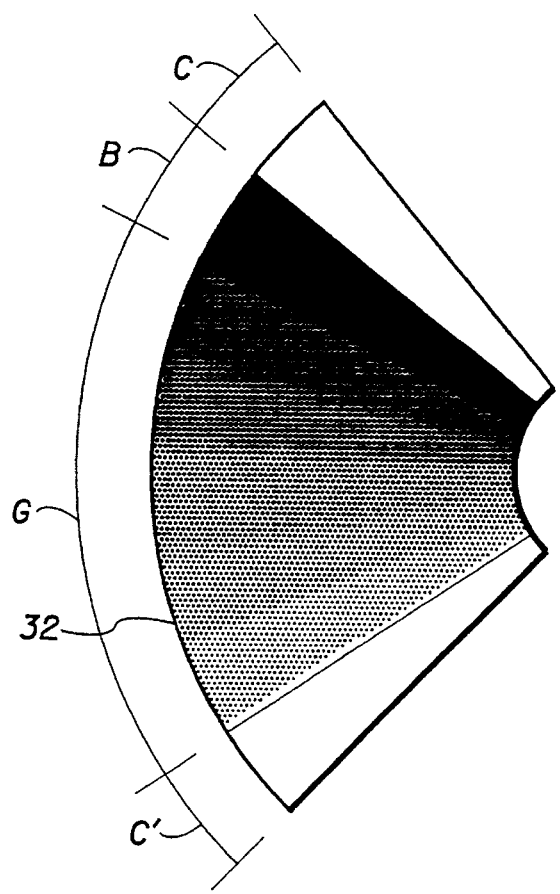
FIG. 3 is an optical gradient wedge incorporating self calibrating segments in accordance with the invention.

Referring to FIG. 3, photo interrupter 32, in one preferred form, comprises a section of photographic film on which a variable optical density pattern is photographically printed.

This pattern includes an optical density gradient segment G from which the position-dependent portion of the output signal is derived. In accordance with a particular feature of the invention, the photo interrupter 32 is additionally provided with calibration segments B and C preceding the optical density gradient segment G. Segment B consists of a maximum density segment, preferably black or opaque, and a minimum density segment C, preferably clear. These segments are used to provide the self calibration function of the invention as described in more detail later. An optional additional clear segment C' is provided at the opposite end of the gradient segment G. Preferably, the photo interrupter is prepared by photographically printing half tone patterns on a photographic emulsion layer to achieve a specific optical density characteristic. The gradient density segment pattern can be varied to produce a linear density change from one end of gradient segment G to the other, or alternatively, other gradient functions such exponential, squared, etc.. The maximum density values of the gradient segment G are substantially the same as, and preferably equal to, the maximum and minimum density values of calibration segments B and C. The patterns may be printed on standard high resolution graphic arts film stock, such as Kodalith film, made by Eastman Kodak Co., achieving densities ranging from a low of 0.05 to a high of 1.0. Half tone resolutions ranging from 180 dots/inch to 1000 dots/inch are satisfactory. In an actually constructed opto sensor, utilizing the pattern illustrated in FIG. 3, segment C consisted of 4 degrees of clear (0.05D), segment B consisted of 4 degrees of black (1.0D), gradient segment G consisted of 28 degrees of linear gradient ranging from 1.0D to 0.05D, and the following segment C' consisted of 4 degrees of clear (0.05D).

Figure 4:
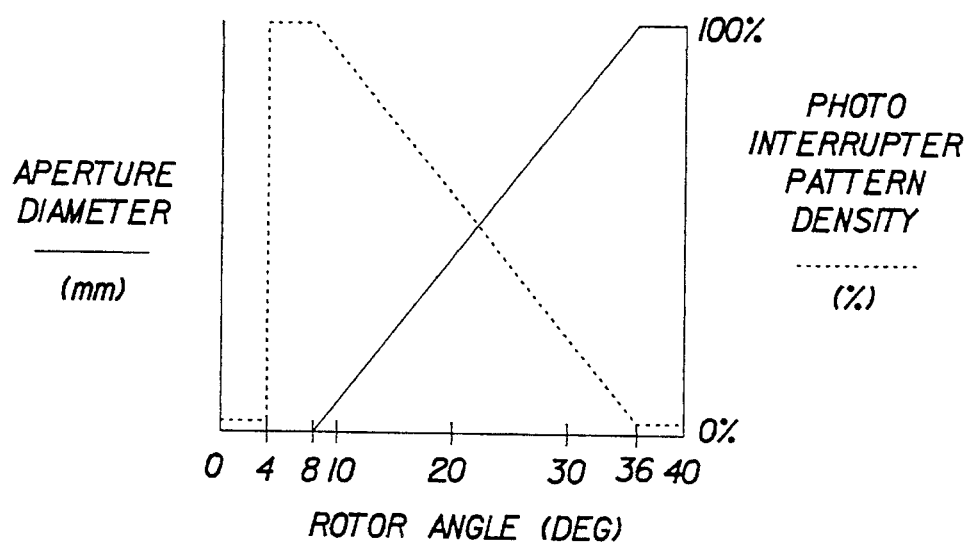
FIG. 4 is a graph illustrating operating characteristics of the assembly of FIG. 1 useful in explaining the operation of the invention.

As previously explained and now shown in FIG. 4, the first 8 degrees of magnet rotor travel occurs before the shutter actually begins to open ("crack of light) during which time the clear and black segments C and B pass through the opto sensor 34. The linear gradient segment G passes through the opto sensor 34 during the shutter aperture opening period and the ensuing 4 degrees of clear segment passes through the opto sensor during the shutter blades over-travel. In accordance with an important feature of the invention, the initial 8 degrees of rotation of the actuator, which precedes the controlled movement range of the actuator, allows control circuitry described hereinafter to obtain maximum and minimum reference signal values for feedback signal calibration before each exposure.

Figure 5:
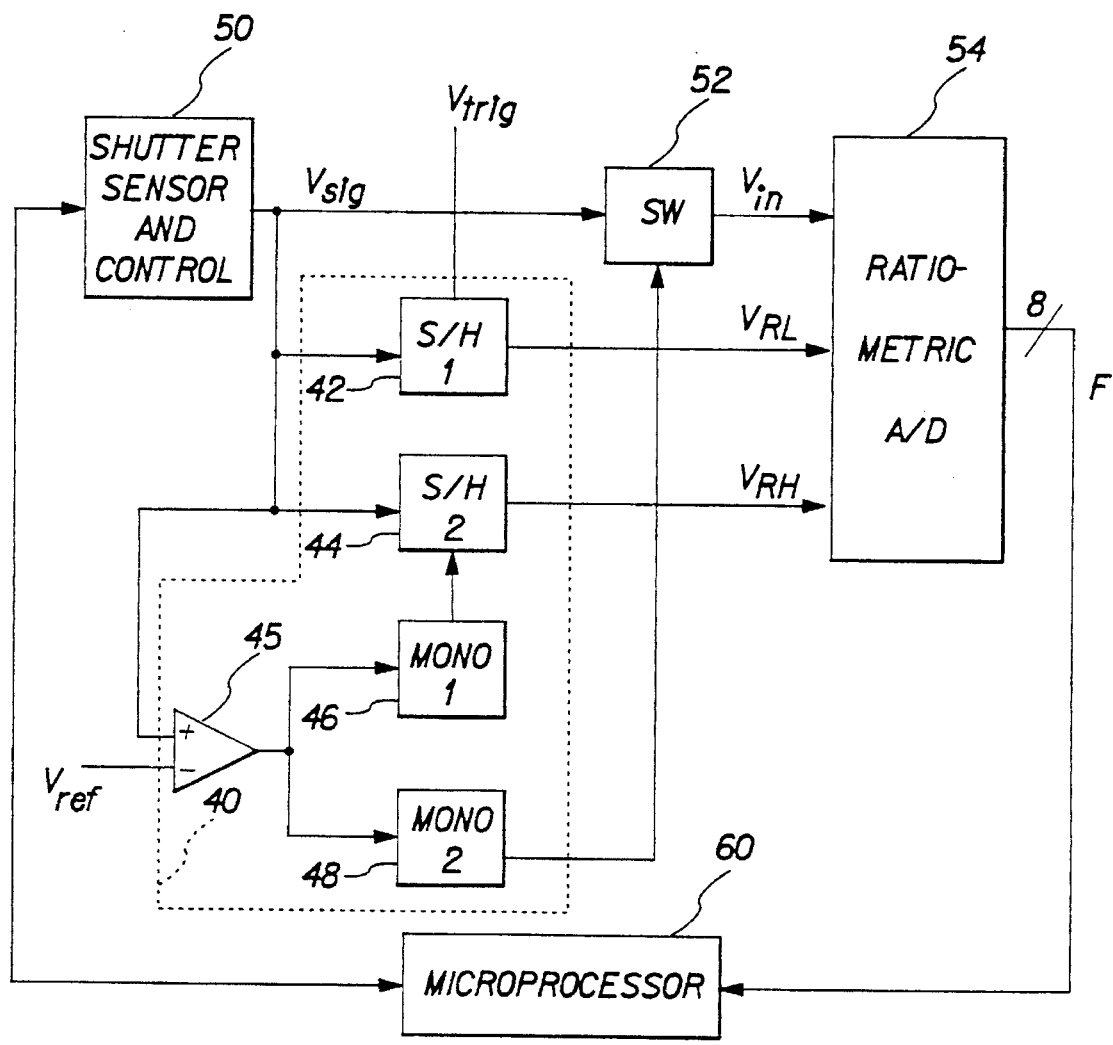
FIG. 5 is a block diagram of a control circuit illustrating one embodiment of the invention.

Referring to FIG. 5, an output signal $V_{trig}$ from the aforedescribed opto sensor 34 (schematically included within shutter sensor and control unit 50) is applied to an analog switch 52 for selective application of the gradient density portion of the output signal to a ratiometric analog-to-digital (A/D) converter 54. Signal $V_{trig}$ is also applied to calibration circuit 40, specifically to sample/hold circuits 44 and 42, respectively, to generate maximum and minimum output signal reference values $V_{RH}$ and $V_{RL}$ from the high and low density segments B and C of the photo interrupter 32 for input to the ratiometric A/D 54. The ratiometric A/D 54 serves as a digital signal scaling means for generating an output feedback signal F, in the form of an 8 bit digital signal, during the gradient portion of signal $V_{sig}$ which is scaled between the high and low reference values $V_{RH}$ and $V_{RL}$ to have a proportionate correspondence, preferably one-to-one, between actuator position and the digital output signal values.

Figure 6:
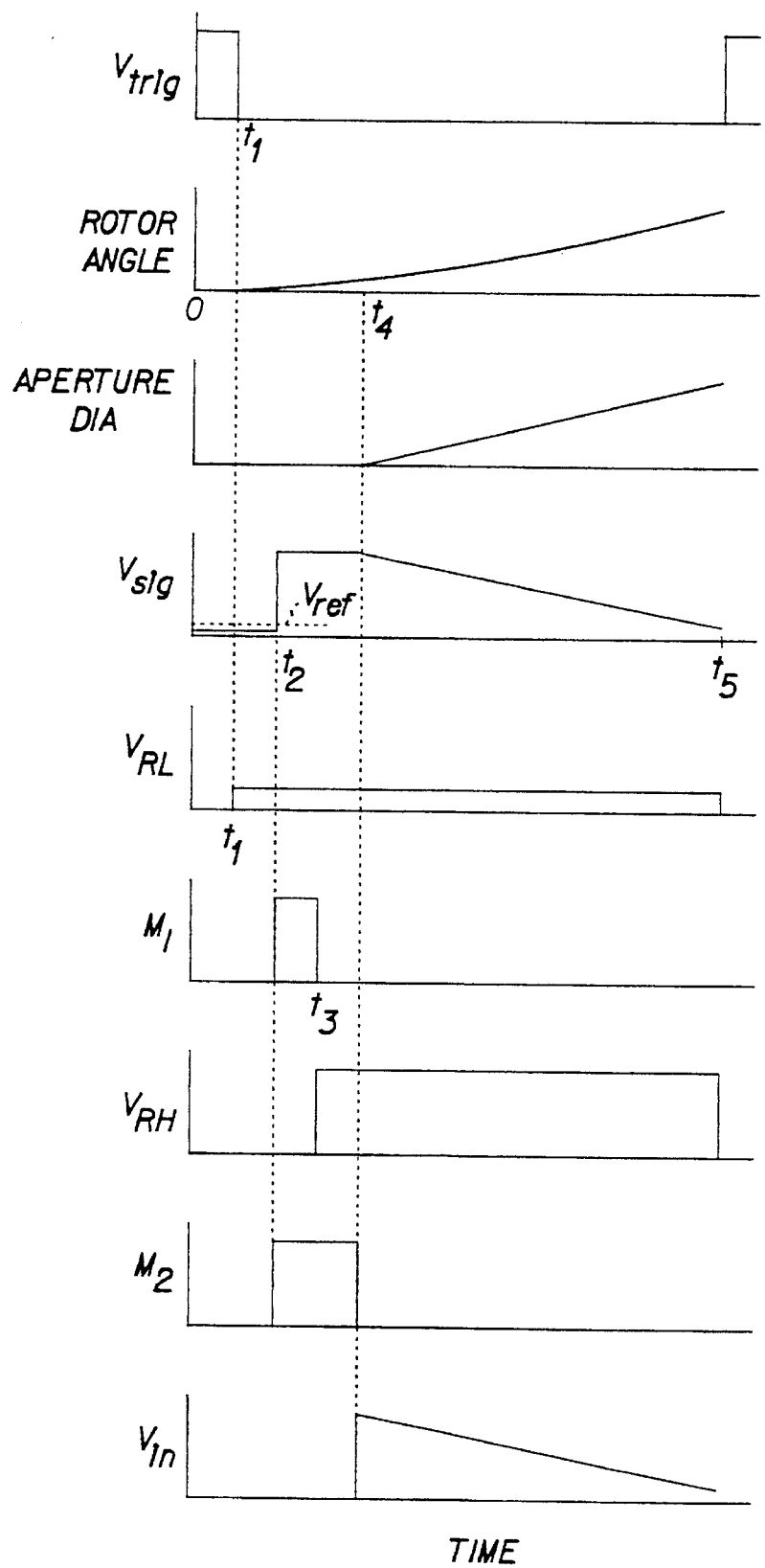
FIG. 6 is a series of signal waveform timing diagrams useful in explaining the operation of the control circuit of FIG. 5.

In operation, with reference to the signal diagrams of FIG. 6, the sensor output signal $V_{sig}$ is low for low optical density values of the photo interrupter and high during high optical density values. A reference level $V_{REF}$, only slightly higher than the low level of $V_{sig}$, is applied to comparator 45 to hold the monostable circuits 46 and 48 off. To start operation of the shutter, $V_{trig}$ initiates current in the shutter coil, under the control of microprocessor 60 to start rotation of the shutter magnet 22. During the initial phase of magnet rotor rotation, 0-$t_4$, the shutter blades, although moving, have not opened the aperture. At $t_4$, the aperture begins to open ("crack of light"). The falling edge of $V_{trig}$ at time $t_1$ triggers sample/hold circuit 42 to sample the sensor output signal $V_{sig}$ during the period that the low density segment C is being sensed thereby generating low reference signal value $V_{RL}$ applied to ratiometric A/D circuit 54. When sensing of the high density segment commences at time $t_2$, $V_{sig}$ at the high input side of comparator 45 rises above the level of $V_{REF}$ causing the output of comparator to go low which triggers both monostable 46 and monostable 48. The high level output $M_1$ of monostable 46 is timed to fall at time $t_3$ which is well within the high period of $V_{sig}$ produced during sensing of the high density segment B of the photo interrupter. The falling edge of output $M_1$ causes sample/hold circuit to sample $V_{sig}$ during this high output period to generate reference $V_{RH}$ applied to ratiometric A/D circuit 54.

Monostable 48 is also triggered to produce an output $M_2$ at the same time as monostable $M_1$. However, the duration of output $M_2$ is designed to extend until time $t_4$ coinciding with the commencement of sensing of the gradient segment G by the opto sensor. The falling edge of output $M_2$ closes analog switch 52 thereby applying the gradient output portion of signal $V_{sig}$, designated $V_{in}$ in the drawing, to the ratiometric A/D 54. As is known in the art, a ratiometric A/D circuit generates an output signal in the form of digital values which are proportionately uniform in the range of the input analog reference values $V_{RH}$ and $V_{RL}$. Thus, the feedback signal to microprocessor 60 is uniformly proportional to shutter aperture opening. Because the reference level $V_{RL}$ and $V_{RH}$ are independently set at the beginning of each shutter operating cycle, the aperture control is independent of battery voltage, temperature and sensor variations from aging and the like.

Figure 7:
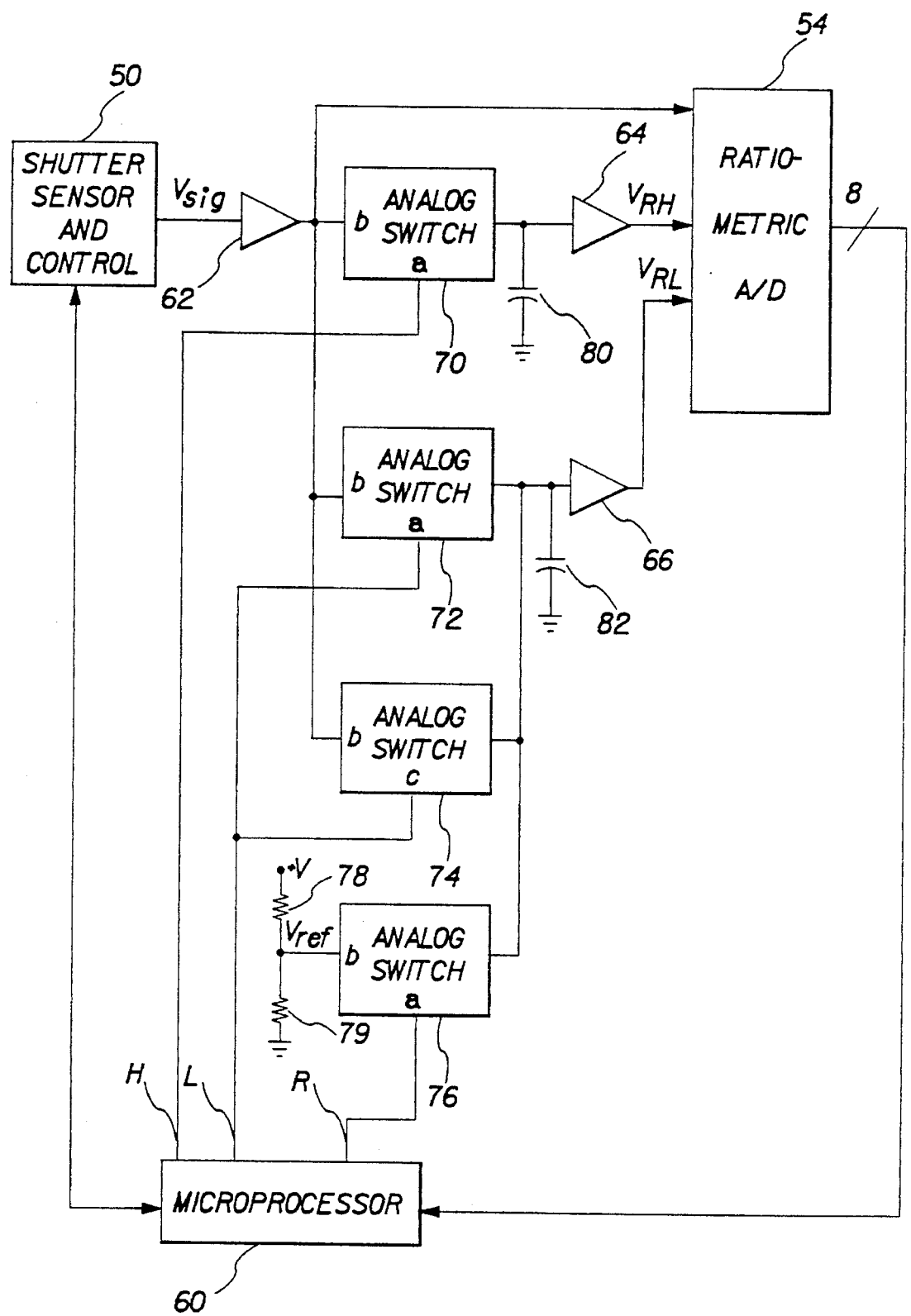
FIG. 7 is a block diagram of an alternative embodiment of a control circuit useful in the present invention.
Figure 8:
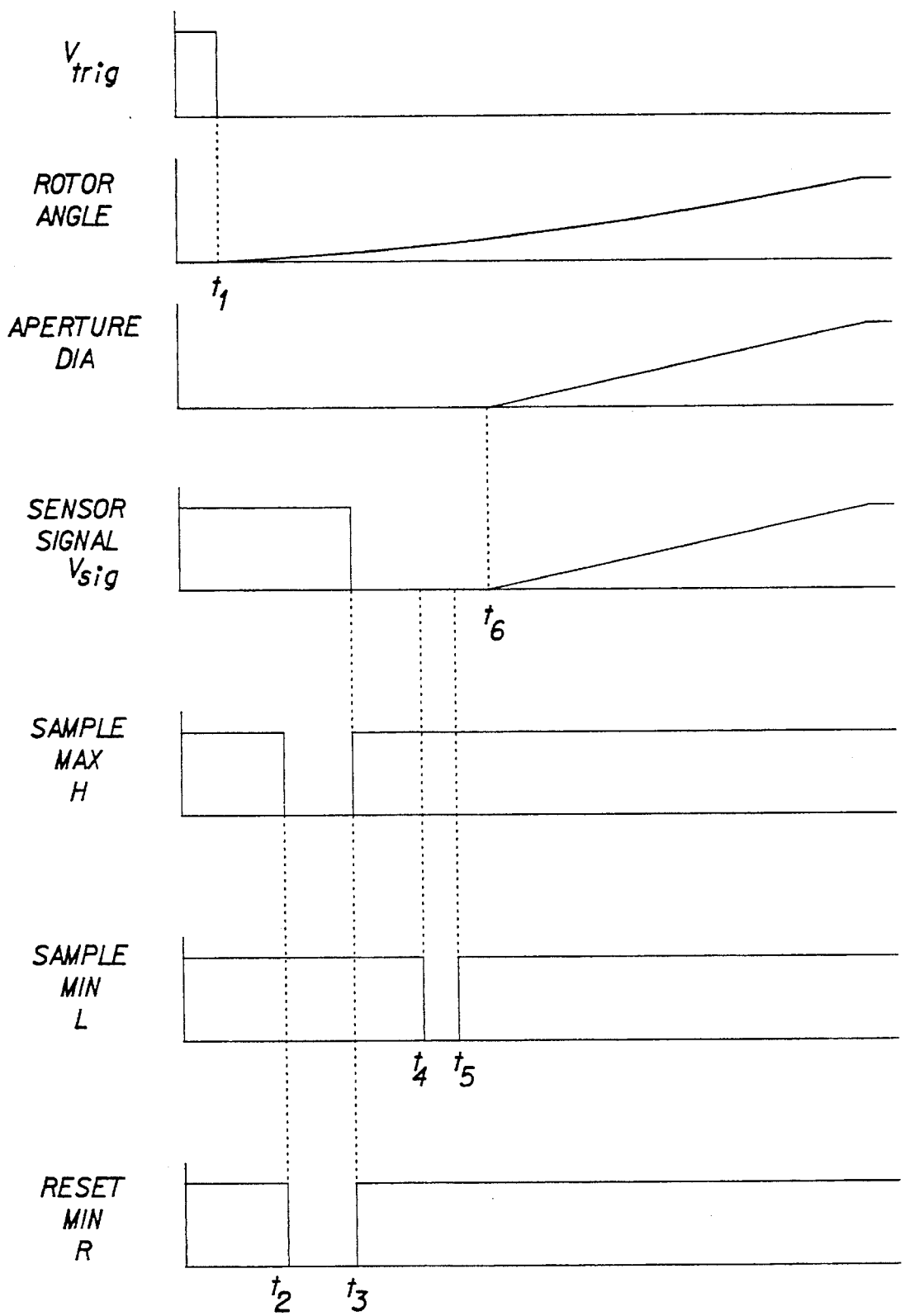
FIG. 8 is a series of signal waveform timing diagrams useful in explaining the operation of the control circuit of FIG. 7.

In FIG. 7, an alternative embodiment of the self calibration circuit is shown. For this circuit, it is assumed the photo interrupter segments are the opposite of the segments shown in FIG. 3 in that the initial segment is a black segment followed by a clear segment and then by the variable optical density gradient segment G which commences at the lowest density value (substantially equal to the density value of the clear segment) and increases to the maximum density (substantially equal to the black density segment) at the end of the gradient segment. In the illustrated embodiment, the microprocessor 60 is a Motorola MC-68MC05B6 microprocessor having within it a ratiometric A/D converter 54 (shown separately in the drawing for convenience) and the required number of I/O lines to implement the auto calibration arrangement of the invention. Buffer amplifiers 60,62, 64 are Texas Instruments TLC274A quad op-amps. Analog switches 70,72,74,76 are Maxim MAX334C quad analog switches used for analog signal control and are operative in response to negative going input controls at terminals "a" to pass through the input signals or voltages levels at terminals "b". The input signal $V_{sig}$ from shutter sensor and control unit 50 is buffered by amplifier 62 and applied to input terminals "b" of each of the analog switches 70,72,74. Switch 70, capacitor 80 and op-amp 64 form a sample and hold circuit for establishing the maximum density reference signal $V_{RH}$ and switches 72,74, capacitor 82 and op-amp 66 form the sample and hold circuit for establishing the minimum density reference signal $V_{RL}$. Timing for the circuit is shown in FIG. 8. A trigger pulse $V_{trig}$ initiates the exposure sequence by starting the rotor (magnet) in motion at time $t_1$.

After motion begins, the sample maximum and reset minimum signals, H and R, from microprocessor 60 go low at time $t_2$. The sample maximum signal H turns on switch 70 which charges capacitor 80 to the voltage level from the sensor in unit 50 occurring during the black density segment corresponding to the full open shutter condition. The reset minimum signal L turns on switch 76 to set the voltage on capacitor 82 to a voltage $V_{REF}$ below the sensor signal minimum density value corresponding to the shutter closed condition. The microprocessor 60 monitors the sensor signal output voltage to determine when the transition from the black density segment B to the clear density segment C occurs at time $t_3$. When this happens, the sample maximum signal H and reset minimum signals go high, opening switches 70 and 76. The microprocessor then causes the sample minimum signal L to go low for a brief period $t_4$–$t_5$ at some time after the transition between segments occurred which is determined by magnet rotor velocity at the time the sample maximum signal H returns high. This causes switches 72,74 to close which charges capacitor 82 to charge to the clear segment C voltage corresponding to the shutter blade opening point ("crack of light"). In this embodiment, the two switches 72,74 are employed to reduce the series resistance during charging of capacitor 82 to minimize errors due to the low voltages involved. The sample low signal L goes high before the shutter blades begin to open at time $t_6$. The gradient density portion of the output signal is then converted by the ratiometric A/D circuit 54. As a result of the operation just described, the high and low reference values are independently established each time the shutter is operated allowing the gradient density signal to be converted accurately and reliably with the shutter aperture being proportional to the scaled digital A/D output of circuit 54 independent of battery voltage, temperature and sensor variations.

The invention has been described with reference to a preferred embodiment. However, it will be appreciated that variations and modifications can be effected by a person of ordinary skill in the art without departing from the scope of the invention. For example, the opto sensor may comprise a reflective type of sensor employing a reflective opto sensor with LED and photo detector on one side of the photo interrupter with the photo interrupter being prepared by printing the pattern of calibrating and gradient density segments on reflective print photographic paper.

PARTS LIST
10 shutter operating mechanism
11 keeper
12 shutter assembly
14 base
16 shutter operating tang
17 notch
20 actuator
22 permanent magnet
23 bobbin
24 poles
25 actuator arm
26 spindle
27 drive post
28 pole legs
30 position sensor
32 photo interrupter
34 opto sensor
35 LED light source
36 opto sensor housing
37 photo diode
40 calibration circuit
42 sample and hold circuit
44 sample and hold circuit
46 sample and hold circuit
52 analog switch
54 ratiometric A/D
60 microprocessor
62,64,66 buffer op amps
70,72,74 analog switches
78,79 $V_{REF}$ voltage divider
80,82 sample and hold capacitors
B black segment on photo interrupter
C clear segment on photo interrupter
G variable optical density segment on photo interrupter

What is claimed is:

1. A self calibrating actuator position control system comprising:

an actuator for effecting a range of movement of an element, a portion of the movement range being controlled by a feedback control signal;

a position sensor having a light source, a photo interrupter having a variable optical density pattern formed thereon and a photo detector for generating an output signal proportional to optical density of said photo interrupter, the photo interrupter pattern having an optical density gradient segment used to generate said feedback control signal and having calibration segments preceding said gradient segment, the calibration segments having predetermined maximum and minimum optical density values;

a calibration circuit responsive to said output signal during sensing of said maximum and minimum optical density segments for generating high and low output signal reference values from said maximum and minimum optical density segments; and signal scaling means for generating a position control output signal from the gradient segment which is scaled between said high and low output signal reference values to have a proportionate correspondence between actuator position and said position control output signal.

2. The system of claim 1 wherein the system is adapted for use in controlling operation of a lens variable aperture mechanism and wherein the actuator comprises an electromagnetic actuator having a rotary magnet.

3. The system of claim 1 wherein said photo interrupter comprises a transmissive pattern photographically formed on film.

4. The system of claim 1 wherein said photo interrupter is a reflective print pattern photographically formed on reflective print paper.

5. The system of claim 1 wherein said optical density gradient segment comprises a variable density half tone pattern and said maximum and minimum density segments are opaque and clear segments, respectively.

6. The system of claim 1 wherein said optical density gradient segment comprises a variable density pattern ranging between predetermined maximum and minimum density values which are substantially the same as the maximum and minimum density values of the calibration segments.

7. The system of claim 1 wherein said claibraion circuit includes means for sampling said photo detector output signal during the occurrence of each of the maximum and minimum optical density segments for generating said high and low output signal reference values prior sensing of the optical density gradient segment.

* * * * *